(12) United States Patent
Yatabe et al.

(10) Patent No.: US 7,924,919 B2
(45) Date of Patent: Apr. 12, 2011

(54) TRANSCODER, RECORDER, AND TRANSCODING METHOD

(75) Inventors: Yusuke Yatabe, Yokohma (JP); Hironori Komi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1344 days.

(21) Appl. No.: 11/367,295

(22) Filed: Mar. 6, 2006

(65) Prior Publication Data
US 2007/0076794 A1 Apr. 5, 2007

(30) Foreign Application Priority Data
Oct. 4, 2005 (JP) .................................. 2005-290638

(51) Int. Cl.
*H04N 7/12* (2006.01)
(52) U.S. Cl. ........... 375/240.12; 375/240.1; 375/240.11; 375/240.13; 375/240.16; 352/59
(58) Field of Classification Search ................ 375/240.1, 375/240.11, 240.12, 240.13, 240.14, 240.16
See application file for complete search history.

(56) References Cited

U.S. PATENT DOCUMENTS

| 7,643,559 | B2 * | 1/2010 | Kato et al. | 375/240.23 |
| 7,746,930 | B2 * | 6/2010 | Sato et al. | 375/240.16 |
| 7,843,996 | B2 * | 11/2010 | Chujoh et al. | 375/240.14 |
| 2005/0058197 | A1 * | 3/2005 | Lu et al. | 375/240.03 |
| 2005/0169377 | A1 * | 8/2005 | Lin et al. | 375/240.16 |
| 2005/0254582 | A1 * | 11/2005 | Takahashi et al. | 375/240.16 |
| 2007/0140348 | A1 * | 6/2007 | Koto et al. | 375/240.16 |

FOREIGN PATENT DOCUMENTS

| JP | 2004-023444 | 1/2004 |
| JP | 2005-176095 | 6/2005 |

* cited by examiner

*Primary Examiner* — Shuwang Liu
*Assistant Examiner* — Hirdepal Singh
(74) *Attorney, Agent, or Firm* — Antonelli, Terry, Stout & Kraus, LLP.

(57) ABSTRACT

In a transcoder that decodes and encodes a motion picture stream, a highly compressed motion picture stream cannot be obtained if the same corresponding frame is referenced for coding purposes in a situation where an intraframe coding mode, in which an unconverted stream is not provided with vector information, is used and in a situation where an interframe predictive coding mode, in which the unconverted stream is provided with vector information, is used. Further, if an additional frame is referenced after searching for the corresponding frame, the circuit scale and power consumption increase. To solve the above problems, the disclosed transcoder comprises a decoder for decoding an input motion picture stream and detecting sub-information indicating whether an intraframe coding scheme or interframe predictive coding scheme is used; and an encoder for changing the frame to be referenced at the time of coding depending on whether the sub-information indicates the use of the intraframe coding scheme or interframe predictive coding scheme.

14 Claims, 8 Drawing Sheets

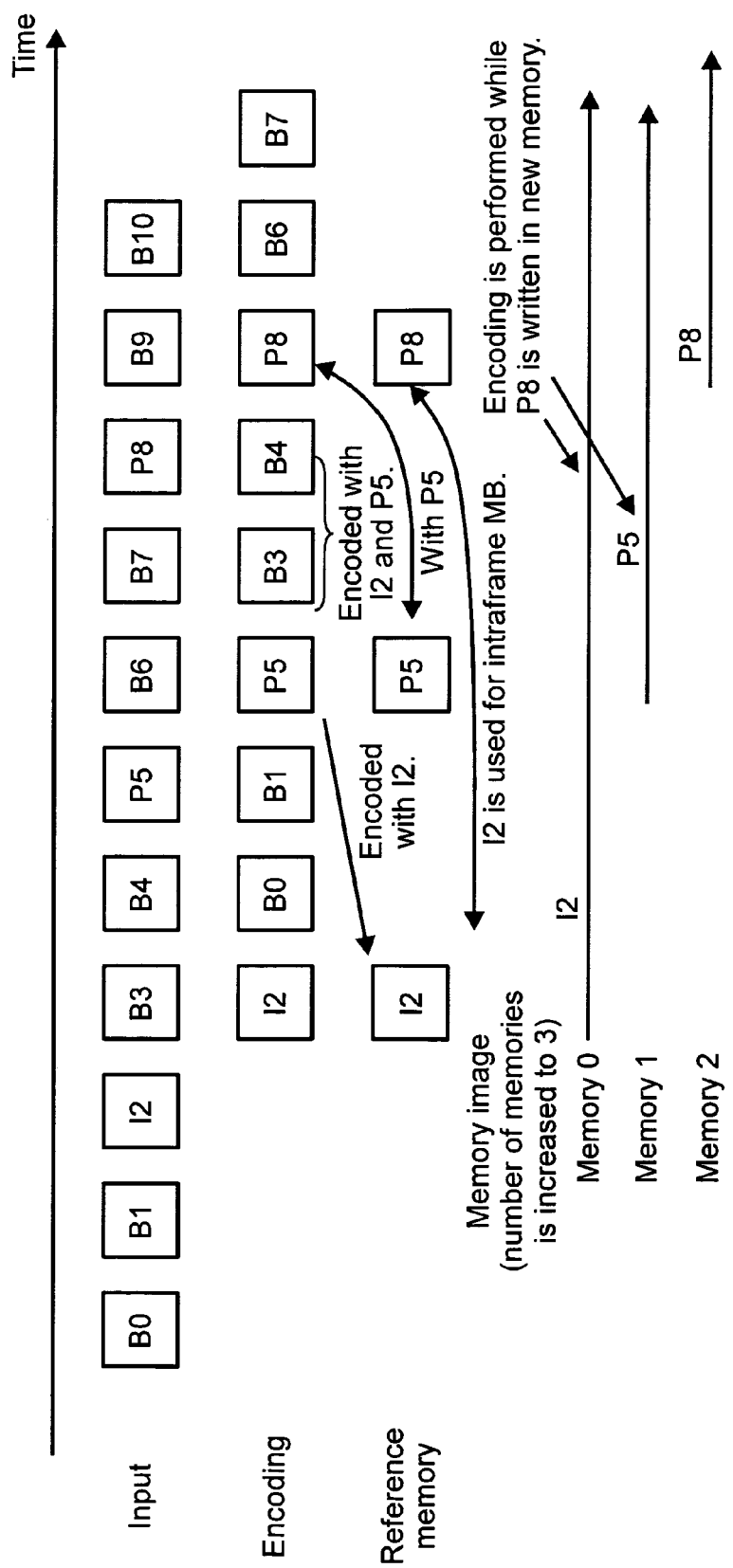

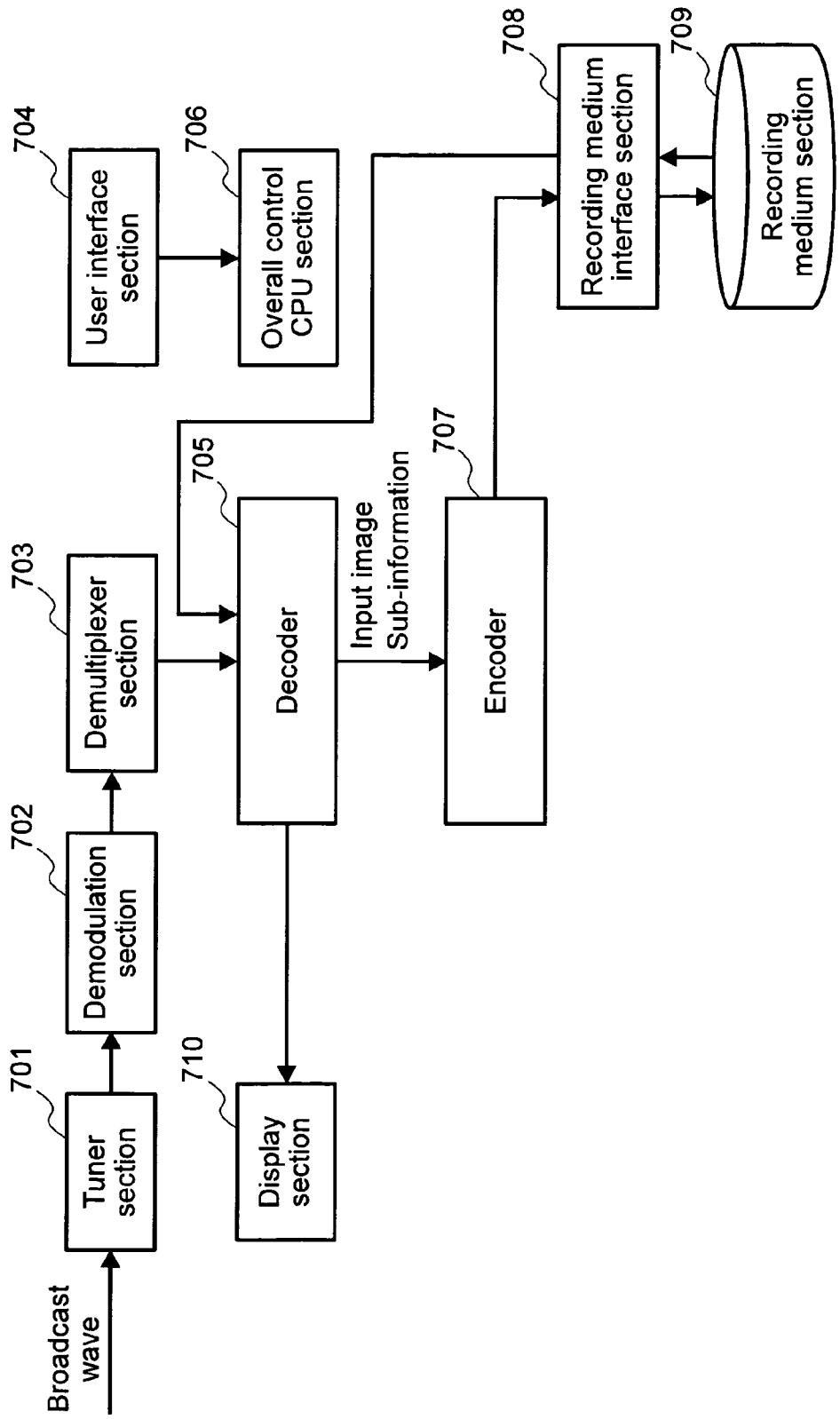

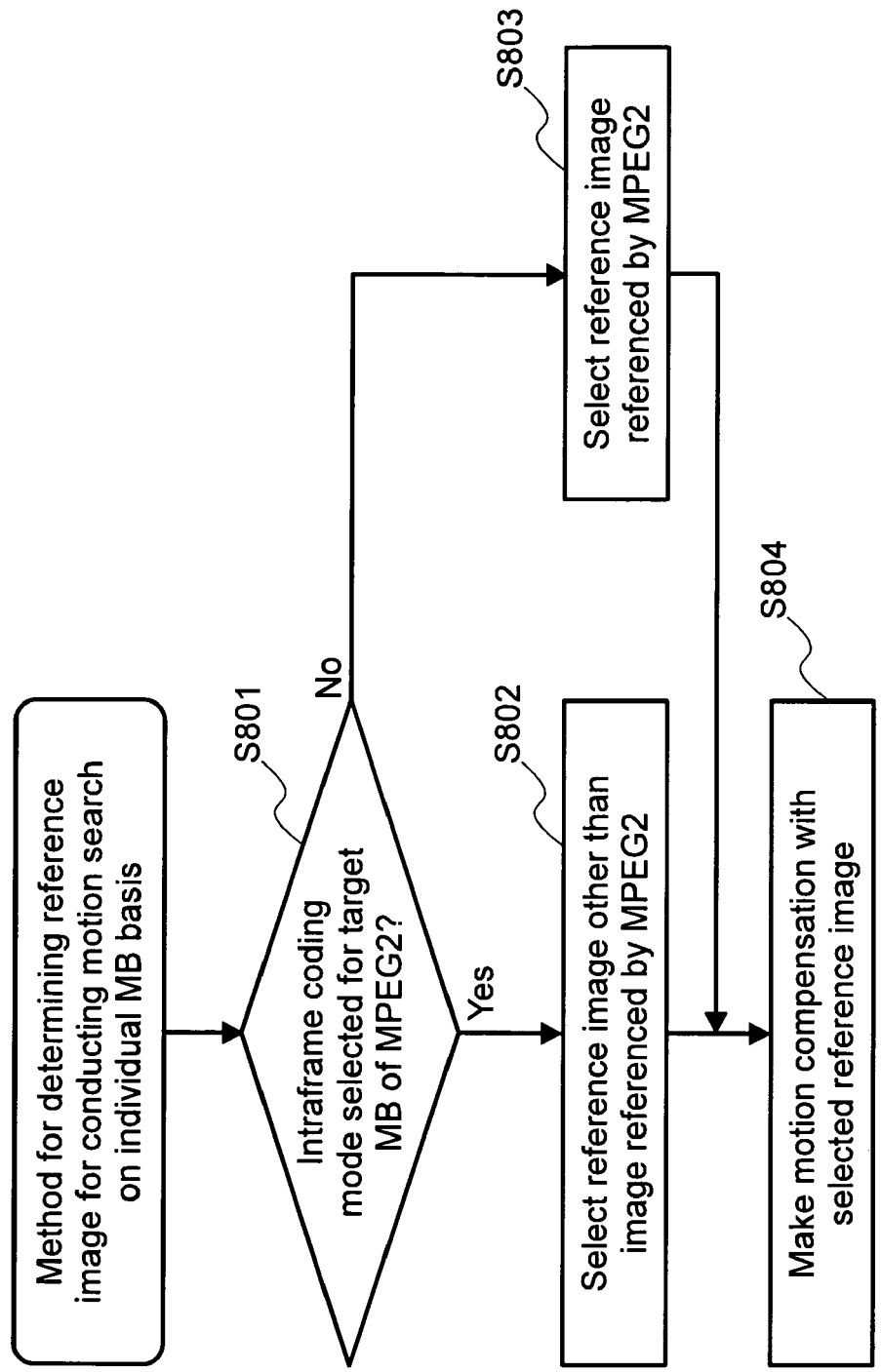

US 7,924,919 B2

TRANSCODER, RECORDER, AND TRANSCODING METHOD

BACKGROUND OF THE INVENTION

1. Field of the Invention

The present invention relates to a transcoder that is capable of subjecting a motion picture stream to bit rate conversion and format conversion.

2. Description of the Related Art

In general, a transcoding technology decodes an. unconverted motion picture stream, uses the resulting decoded image as an input image, and encodes the decoded image in a new format. A technology disclosed by Japanese Patent JP-A No. 23444/2004 relates to transcoding and reduces the processing load on the encoding side by using a vector, which is a motion search result obtained from an unconverted motion picture stream, as motion information among encoding information.

SUMMARY OF THE INVENTION

However, Japanese Patent JP-A No. 23444/2004, which is mentioned above, does not describe a transcoding operation that is performed by using information indicating whether frames are intraframe-coded or interframe-coded.

If the frames are interframe-coded, there is a correlation between a reference frame and the frame to be encoded. Therefore, the reference frame can be determined in accordance with the same relationship as an unconverted stream relationship.

If, on the other hand, the reference frame is determined in accordance with the same relationship as an unconverted stream relationship in a situation where the frames are intraframe-coded, compression cannot be achieved with high efficiency because there is an inadequate correlation between the reference frame and the frame to be encoded.

Further, if two frames are sequentially searched for in accordance with the same relationship as an unconverted stream relationship, an extra process needs to be performed. Therefore, this type of operation is not suitable for circuit scale reduction and power consumption reduction.

To solve the above problem, the present invention aims at providing an easy-to-use transcoder, recorder, and transcoding method for transcoding by using information indicating whether the encoded information attached to an unconverted stream is interframe-coded or intraframe-coded.

One aspect of the present invention is directed to a transcoder that decodes a motion picture stream encoded by using a first coding scheme, which provides intraframe coding and interframe predictive coding, and encodes the decoded motion picture stream by using a second coding scheme. The transcoder includes a decoder for decoding an input motion picture stream and detecting sub-information indicating whether an intraframe coding scheme or interframe predictive coding scheme is used; and an encoder for changing the frame to be referenced at the time of coding or changing the order of frame searching depending on whether the sub-information indicates the use of the intraframe coding scheme or interframe predictive coding scheme.

BRIEF DESCRIPTION OF THE DRAWINGS

Embodiments of the present invention will be described in detail based on the following figures, wherein:

FIG. 6 illustrates a typical reference memory configuration;

FIG. 7 shows an example of a product to which the first embodiment of the present invention is applied; and FIG. 8 is a flowchart illustrating a reference image selection sequence.

DESCRIPTION OF THE PREFERRED EMBODIMENTS

An embodiment of the present invention will now be described on the assumption that MPEG2-to-H.264 conversion is to be effected. However, the present invention can also be applied to a case where intraframe coding and interframe predictive coding are performed and a motion picture stream compressed by using a coding scheme having information indicating whether the information about a frame is generated by intraframe-or interframe-coding the frame is to be transcoded. The applicable coding schemes are MPEG4, H.261, H.263, and SMPTE VC1 in addition to MPEG2 and H.264.

H.264 (ITE/ISO 14496-10/H.264AVC), for example, permits multi-frame motion compensation in which a reference frame for motion compensation can be arbitrarily selected from decoded frames.

Figure 1:
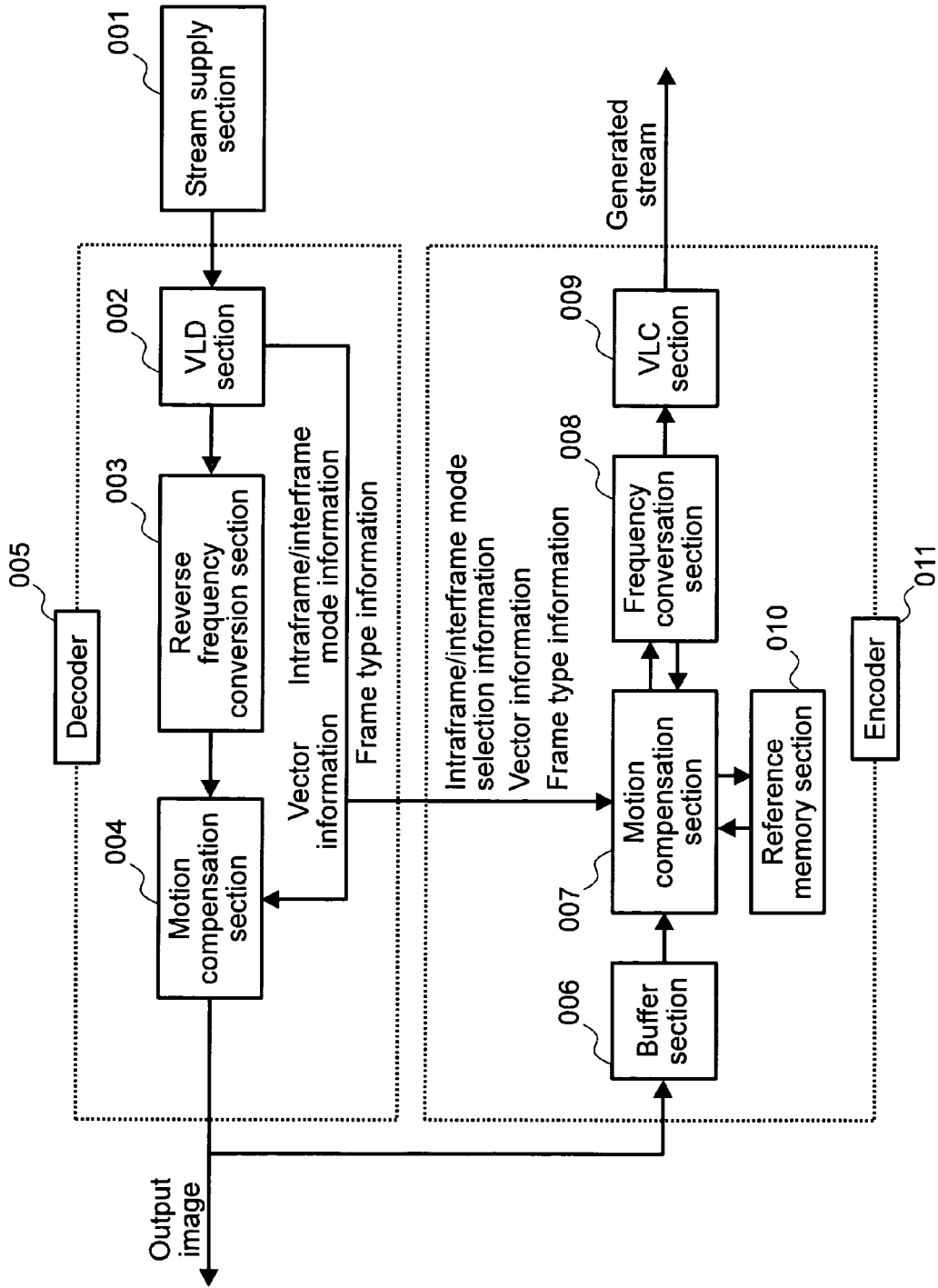
FIG. 1 is a block diagram illustrating a first embodiment of the present invention.

The configuration of an embodiment of the present invention will now be described with reference to FIG. 1. The upper half of the figure, represents a decoder (decoding device) 005. The decoder 005 includes a stream supply section 001 for supplying a digital motion picture stream read from a broadcast, recording medium, or the like; a VLD section 002 for deciphering a decoding syntax; a reverse frequency conversion section 003 for effecting frequency conversion region-to-image region conversion; and a motion compensation section 004 for making motion compensation from a reference image by using vector information decoded by the VLD section and creating a decoded image (output image) by adding the output from the reverse frequency conversion section.

The lower half of the figure represents an encoder (encoding device) 011. The encoder 011 includes a buffer section 006 for receiving an output image from the decoder and storing it in a buffer as an input image; a motion compensation section 007, which is capable of making motion compensation between the input image and a plurality of encoded reference images; a frequency conversion section 008 for subjecting a motion-compensated error image to frequency conversion; a VLC section 009 for performing encoding by using a syntax that complies with the requirements; and a reference memory section 010, which is a reference image storage section for using an encoded image as the reference image for later motion compensation.

The decoder decodes a frame header of each frame and performs a decoding process on each rectangular region called a macroblock (MB). In such an instance, the motion compensation section of the encoder can use an after-mentioned picture encoding type as well as vector information and intraframe/interframe information decoded on an individual MB basis.

The description of the present embodiment assumes that the above-mentioned decoder complies with MPEG2 (ISO/

IEC 13813-2, International Standard), which is an international standard for motion picture encoding, and that the above-mentioned encoder complies with H.264 (ISO/IEC 14496-10/ITU H.264 AVC).

Figure 2:
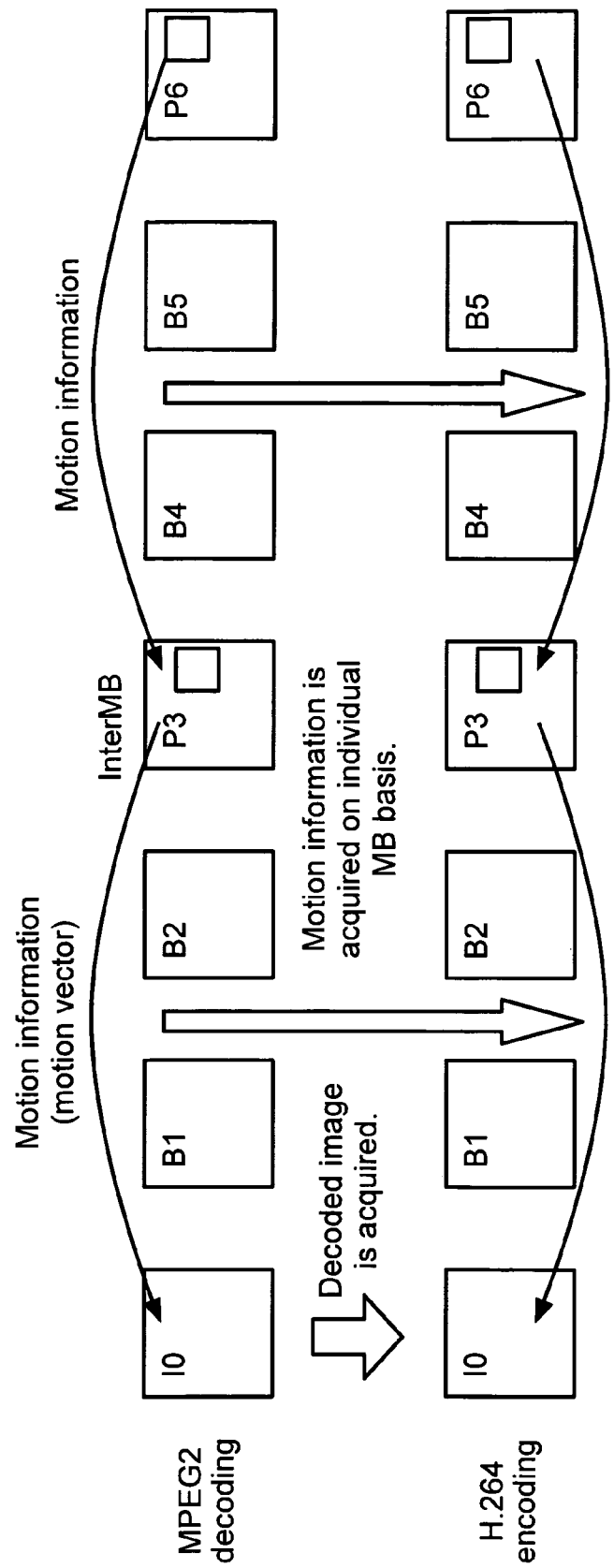
FIG. 2 is a conceptual diagram illustrating the first embodiment of the present invention.

FIG. 2 outlines the present embodiment. The upper half of the figure shows MPEG2 stream decoding prior to transcoding. The symbols I, B, and P represent a picture coding type. The symbol I denotes coding in which only the on-screen information is used (intra-coded). The symbol P denotes coding in which the past information is also available (predictive codec). The symbol B denotes coding in which the past information and future information are both available (bidirectionally predictive codec).

The lower half of the figure shows H.264 encoding. An MPEG2 decoded image is used as an input image for encoding. The coding type is the same as that for MPEG2, which is the conversion source.

When the configuration described above is employed, the vector information attached to MPEG2 can be used for H.264 encoding. When H.264 encoding is to be performed, the MPEG2 vector information corresponding to the MB targeted for coding is acquired and used. In this manner, the H.264 encoder can reduce the number of motion search circuits in which the calculation amount is large, thereby reducing the encoder's circuit scale.

Figure 3:
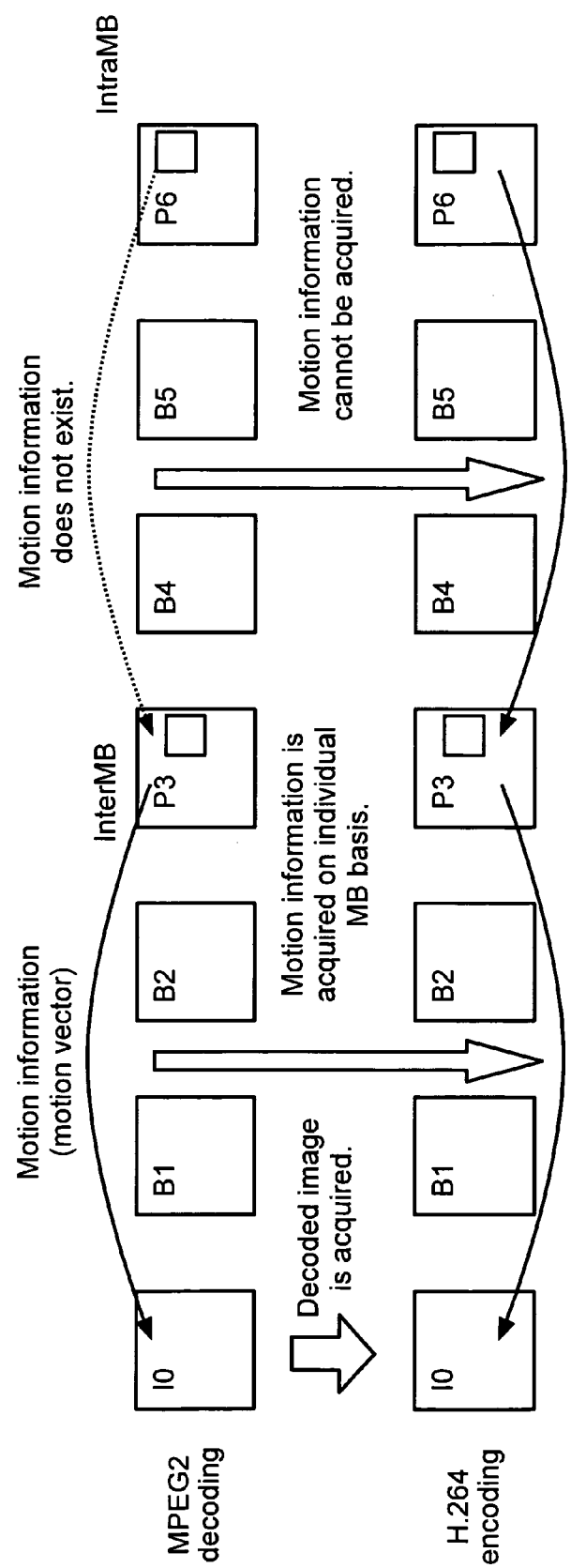
FIG. 3 is a conceptual diagram illustrating the first embodiment of the present invention.

When coding is performed in the intraframe mode in which the MPEG2 MB does not have vector information as indicated in FIG. 3, the H.264 encoder cannot acquire the vector information from MPEG2. In this instance, the H.264 encoder can also be placed in the intraframe mode. However, when the image quality is to be improved with the circuit scale and power consumption reduced, an effective method would be to newly conduct the following search.

As regards the MB of an MPEG2 stream for which the intraframe mode is selected, it is judged that there is an inadequate correlation to the reference image that is originally referenced by MPEG2. Thus, the H.264 encoder does not newly conduct a search on that reference frame.

FIG. 8 is a flowchart illustrating a reference image selection sequence. When H.264 is to be used for encoding on an individual MB basis, step S801 is performed to reference information indicating whether the intraframe or interframe mode is used for each MPEG2 MB. When the intraframe mode is used, step S802 is performed to exclude the reference image referenced by MPEG2 from motion compensation by H.264, and select a reference image that is not referenced by MPEG2. Step S804 is then performed to make motion compensation with the selected reference image. When, on the other hand, the interframe mode is used, step S803 is performed to select a reference image that is referenced by MPEG2. Next, step S804 is performed to make H.264 motion compensation.

The method of selecting an efficient reference image by conducting a search on a plurality of reference images for the purpose of achieving multi-frame encoding in a low-power-consumption H.264 encoder LSI is nonfeasible because it enlarges the circuit scale and increases the power consumption. For circuit scale and power consumption reduction purposes, therefore, the H.264 encoder provides motion compensation for the same number of reference frames as is the case with MPEG2, which is a conventional technology. As regards the present embodiment, reference images providing inadequate correlation, for which the intraframe mode is selected, should be excluded from referencing for increased efficiency.

Figure 4:
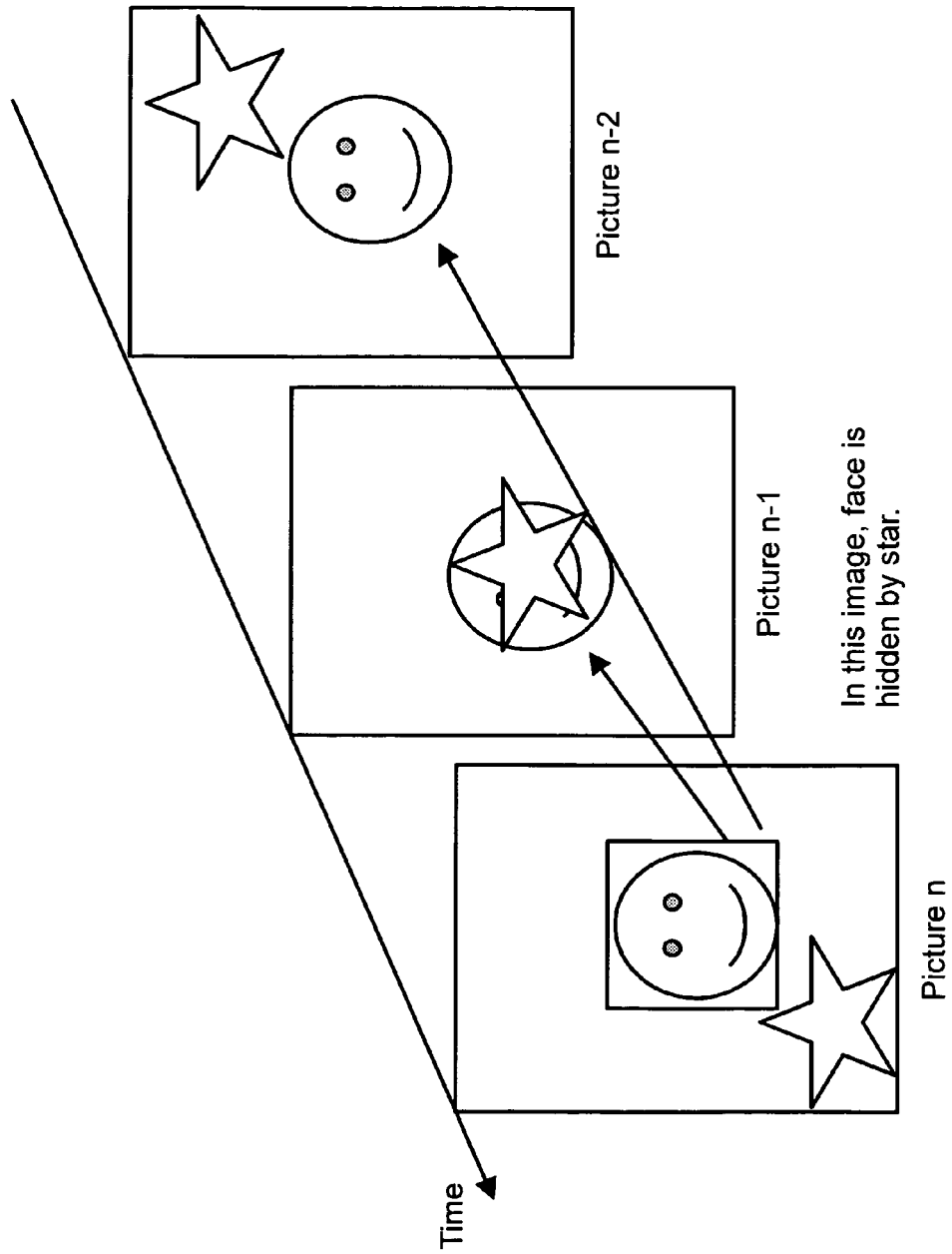
FIG. 4 illustrates a typical uncovered area.

Further, when the intraframe mode is selected for MPEG2, it is conceivable that an uncovered area may be encountered as indicated in FIG. 4. This phenomenon occurs when a hidden area appears. Since the newly visible area is not contained in a reference image, the degree of time correlation decreases. In FIG. 4, a star moves from the upper right corner to the lower left corner. If picture n references picture n−1 when a face appears, the degree of correlation decreases. In picture n−2, which is a preceding past image, however, it is possible that an increased degree of correlation may be provided. When MPEG2 is in the intraframe mode, the present embodiment selects the preceding past image as a reference image with a view toward encountering an increased degree of correlation.

Figure 5:
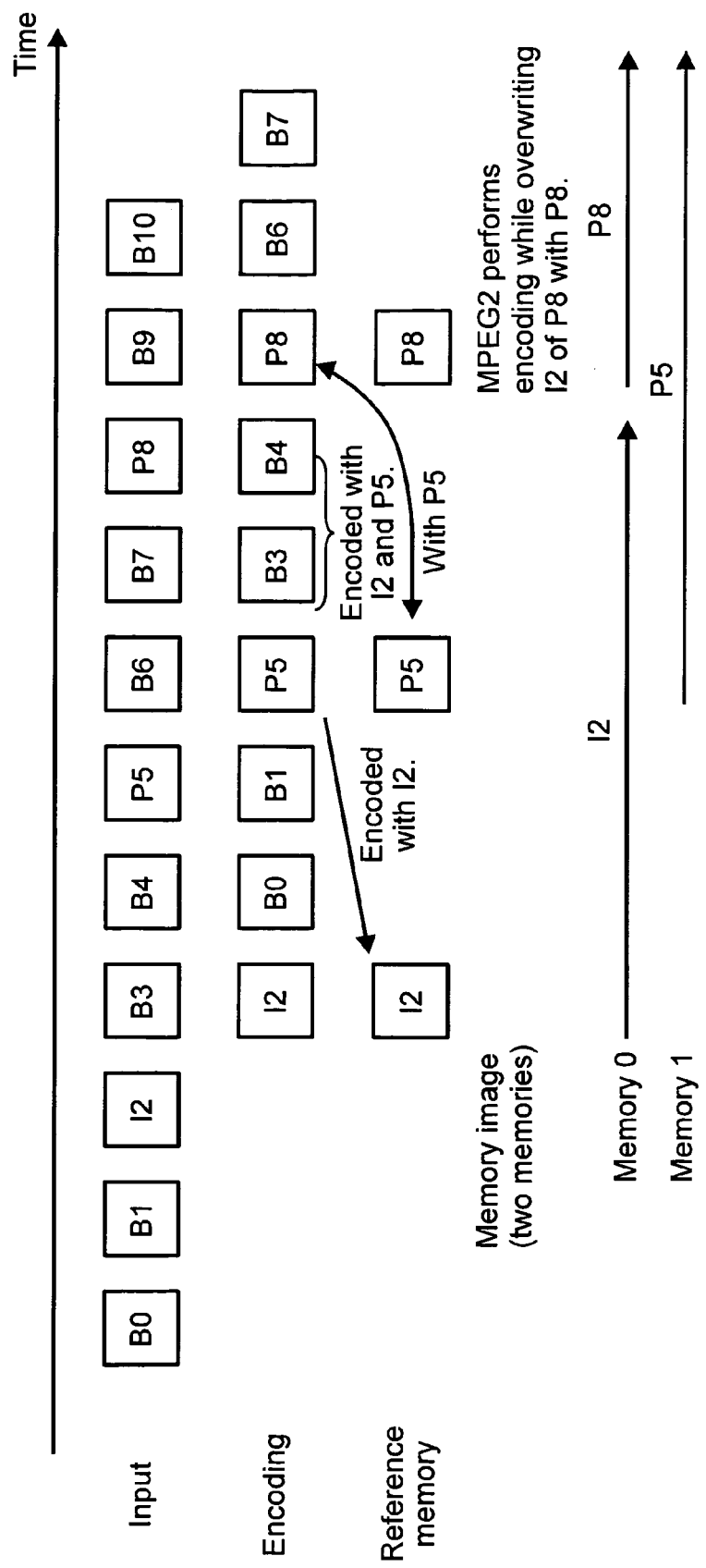
FIG. 5 illustrates a typical reference memory configuration.

An example of the above-mentioned reference image is described below. In encoding, a coded image is used later as a reference image as indicated in FIG. 5. Therefore, the coded image needs to be stored in a reference memory. When the referencing relationship is the same as for MPEG2, two reference memories are used. The images stored in the two reference memories are used for encoding purposes. The present embodiment increases the number of memories by one to increase the number of reference images as indicated in FIG. 6. When the motion compensation information is not obtained in the intraframe mode, the present embodiment performs referencing from the I2 frame, which is stored in a memory due to an increase in the number of memories.

In a situation where the number of memories is increased by one as mentioned above, any completely decoded frames can be stored in a memory area and referenced. In such a situation, the first frame of a certain encoding unit (e.g., GOP) may be stored and targeted for referencing. When the number of memories is further increased, the number of reference candidates can be increased. From the viewpoint of circuit scale reduction, however, it is preferred that the reference memory section include three memories as indicated in FIG. 6.

When the uncovered area is considered, the search range on the reference image need not always be broad. The search range may comprise several surrounding relevant pixels.

When the present embodiment is used to remove reference images that provide inadequate correlation, multi-encoding effects can be produced with the circuit scale and power consumption reduced.

A typical product to which the present embodiment can be applied will now be described. The present embodiment is applicable to a situation where an analog or digital television broadcast or a prerecorded broadcast program is to be saved on a hard disk, DVD, or other recording medium with the coding format and coding rate changed. FIG. 7 is a block diagram illustrating a process that is performed to save a digital broadcast on a recording medium. A digital broadcast that is received by a tuner section 701 is forwarded to a demodulation section 702. The demodulation section 702 performs a decoding process on the digital broadcast. Next, a demultiplexer section 703 separates the digital broadcast into motion picture information, audio information, and the like. The motion picture information is decoded by a decoder 705. When an image is to be output to a display, the decoded image is forwarded to a display section 710. An encoder acquires a playback image and sub-information, which are decoded by the decoder, and performs a coding process to generate a stream.

The embodiment described above ensures that high quality is achieved when a motion picture is subjected to bit rate conversion or format conversion.

The foregoing invention has been described in terms of preferred embodiments. However, those skilled, in the art will recognize that many variations of such embodiments exist.

Such variations are intended to be within the scope of the present invention and the appended claims.

The invention claimed is:

1. A transcoder for decoding a motion picture stream encoded by using a first coding scheme, which provides intraframe coding and interframe predictive coding, and encoding the decoded motion picture stream by using a second coding scheme, the transcoder comprising:
a decoder for decoding an input motion picture stream and detecting sub-information indicating whether an intraframe coding scheme or an interframe predictive coding scheme is used, wherein the sub-information is attached to each decoding process unit within a frame; and
an encoder for changing the frame to be referenced at the time of coding depending on whether the sub-information indicates the use of the intraframe coding scheme or the interframe predictive coding scheme,
wherein a reference frame for motion compensation can be selected from a plurality of decoded frames in units of an encoding process unit in the second coding scheme,
when a frame to be encoded in the second coding scheme used the interframe predictive coding scheme in the first coding scheme and the sub-information attached to encoding process unit within the frame to be encoded indicates the use of the intraframe coding scheme, a decoded frame which was not referenced in the first coding scheme is selected as a reference frame for the encoding process unit in the second coding scheme.

2. The transcoder according to claim 1, wherein
the input motion picture stream includes a first input F1 frame, which is coded using a certain input F0 frame as a reference target while switching between the interframe predictive coding scheme and the intraframe coding scheme for each coding process unit, and
a second input F2 frame, which is coded using the first input F1 frame as a reference target while switching between the interframe predictive coding scheme and the intraframe coding scheme for each coding process unit; and
wherein the encoder references a first output F1 frame image corresponding to the first input F1 frame, and performs an interframe predictive coding process on a second output F2 frame corresponding to the second input F2 frame when the sub-information for the second input F2 frame indicates that the interframe predictive coding scheme is used, and references an output F0 frame corresponding to the input F0 frame, and performs an interframe predictive coding process on the second output F2 frame when the sub-information for the second input F2 frame indicates that the intraframe coding scheme is used.

3. The transcoder according to claim 2, wherein the encoder does not reference the first output F1 frame but references the output F0 frame, and performs the interframe predictive coding process on the second output F2 frame when the sub-information for the second input F2 frame indicates that the intraframe coding scheme is used.

4. The transcoder according to claim 2, wherein
the encoder does not reference the first output F1 frame, but references a decoded frame when the sub-information for the second input F2 frame indicates that the intraframe coding scheme is used.

5. The transcoder according to claim 2, wherein:
the input F0 frame is an input I frame, which is an intraframe-encoded I picture;

the first input F1 frame is a first input P frame, which is a P picture that is interframe-predictive-coded by referencing the input I frame; and
the second input F2 frame is a second input P frame, which is a P picture that is interframe-predictive-coded by referencing the first input P frame.

6. The transcoder according to claim 2, wherein
when the sub-information for the second input F2 frame indicates that the intraframe coding scheme is used, the encoder searches several pixels surrounding a search target position at the time of vector information detection for interframe predictive coding.

7. The transcoder according to claim 1, wherein
the encoder includes a reference memory section that has three memories for reference frame storage.

8. The transcoder according to claim 1, wherein
the encoder searches for only one frame that is to be referenced.

9. The transcoder according to claim 1, wherein
the sub-information is attached to each macroblock, which is the decoding process unit within a frame.

10. The transcoder according to claim 1, wherein
the first coding scheme is an MPEG method; and wherein the second coding scheme is an H.264 method.

11. A recorder comprising:
a recording medium interface for reading a motion picture stream that is recorded on a recording medium and coded by using the first coding scheme; and
the transcoder according to claim 1 into which the motion picture stream read by the recording medium interface is input,
wherein the recording medium interface records on the recording medium, the motion picture stream that is output from the transcoder and coded by using the second coding scheme.

12. A transcoder for decoding a motion picture stream encoded by using a first coding scheme, which provides intraframe coding and interframe predictive coding, and encoding the decoded motion picture stream by using a second coding scheme, the transcoder comprising:
a decoder for decoding an input motion picture stream and detecting sub-information indicating whether an intraframe coding scheme or an interframe predictive coding scheme is used, wherein the sub-information is attached to each decoding process unit within a frame; and
an encoder for changing the order of searching for the frame to be referenced at the time of coding depending on whether the sub-information indicates the use of the intraframe coding scheme or the interframe predictive coding scheme,
wherein a reference frame for motion compensation can be selected from a plurality of decoded frames in units of an encoding process unit in the second coding scheme,
when a frame to be encoded in the second coding scheme used interframe predictive coding scheme in the first coding scheme and the sub-information attached to an encoding process unit within the frame to be encoded indicates the use of the intraframe coding scheme, a decoded frame which was not referenced in the first coding scheme is searched for as the reference frame for the encoding process unit in the second coding scheme.

13. The transcoder according to claim 12, wherein the input motion picture stream includes an input I frame, which is an intraframe-coded I picture, a first input P frame, which is a P picture that is interframe-predictive-coded by referencing the input I frame, and a second input P frame, which is a P picture that is interframe-predictive-coded by referencing the first input P frame; and wherein when the sub-information for the second input P frame indicates that the interframe predictive coding scheme is used, the encoder references a first output P frame image corresponding to the first input P frame and performs an interframe predictive coding process on a second output P frame corresponding to the second input P frame, and when the sub-information for the second input P frame indicates that the intraframe coding scheme is used, the encoder searches for frames other than the first output P frame for the frame to be referenced, and performs the interframe predictive coding process on the second output P frame.

14. A transcoding method for decoding a motion picture stream encoded by using a first coding scheme, which provides intraframe coding and interframe predictive coding, and encoding the decoded motion picture stream by using a second coding scheme, wherein:

a frame to be decoded is provided with sub-information that indicates whether an intraframe coding scheme or an interframe predictive coding scheme is used, wherein the sub-information is attached to each decoding process unit within the frame; and the frame to be referenced at the time of coding, changes depending on whether the sub-information indicates the use of the intraframe coding scheme or the interframe predictive coding scheme, wherein a reference frame for motion compensation can be selected from a plurality of decoded frames in units of an encoding process unit in the second coding scheme, when a frame to be encoded in the second coding scheme used interframe predictive coding scheme in the first coding scheme and the sub-information attached to an encoding process unit within the frame to be encoded indicates the use of the intraframe coding scheme, a decoded frame which was not referenced in the first coding scheme is selected as the reference frame for the encoding process unit in the second coding scheme.

* * * * *